July 31, 1945.　　　　J. W. KOLB　　　　2,380,849
ANTI-GLARE HEADLIGHT
Filed April 21, 1944　　　　2 Sheets-Sheet 1
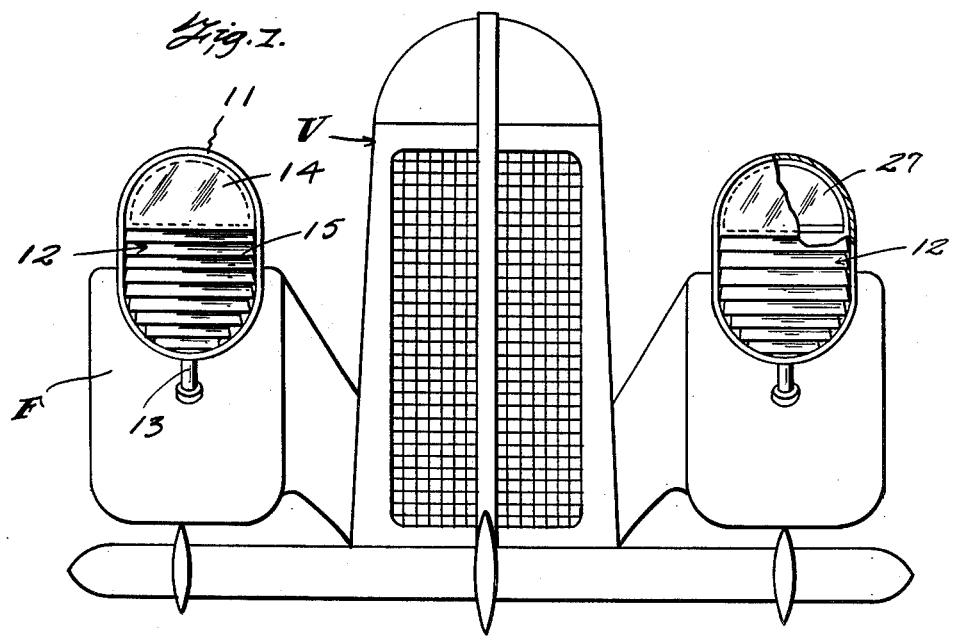
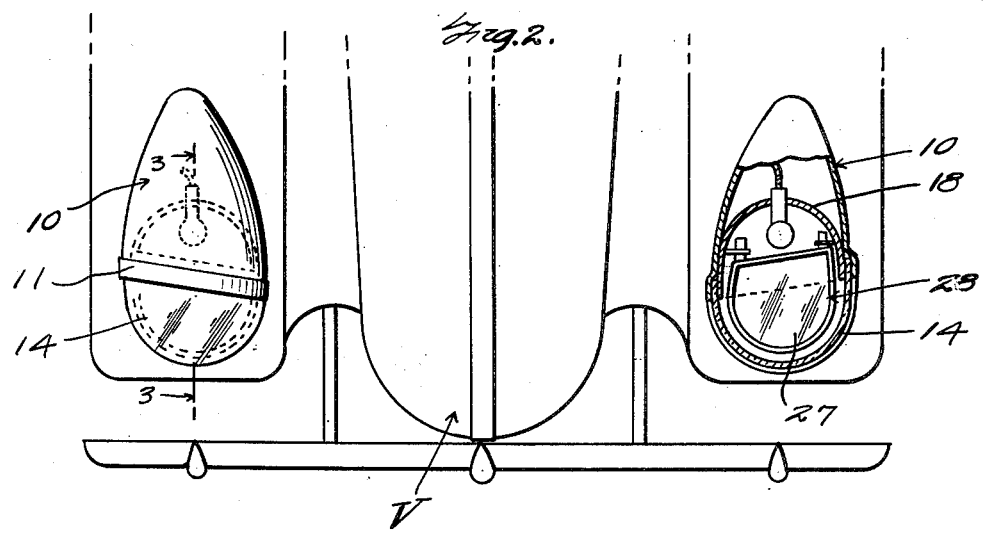
Inventor
J. WILLIAM KOLB
By Kimmel & Crowell
Attorneys July 31, 1945.   J. W. KOLB   2,380,849
ANTI-GLARE HEADLIGHT
Filed April 21, 1944   2 Sheets-Sheet 2

Inventor
J. WILLIAM KOLB

By Kimmel & Crowell
Attorneys

Patented July 31, 1945

2,380,849

UNITED STATES PATENT OFFICE 2,380,849

ANTIGLARE HEADLIGHT

John William Kolb, De Kalb, Tex.

Application April 21, 1944, Serial No. 532,127

1 Claim. (Cl. 240—45)

This invention relates to an improved antiglare vehicle headlight.

An object of this invention is to provide an anti-glare headlight which is so constructed as to eliminate glare forwardly of the vehicle and at the same time to provide an improved lighting for the opposite sides of the road.

Another object of this invention is to provide in a headlight a colored shield interposed between the light source and the outer lens so that differentially colored shields for identification may be used at the front of the vehicle in order that an approaching vehicle will be able to determine which one of the two headlights has burned out in the event one of the headlights is not lighted.

A further object of this invention is to provide an improved headlight of this kind which is formed with a gravity operated or weighted shield so that the light rays will not glare too high above the roadway when the vehicle is on an inclination or passing over the crest of a hill.

With the foregoing and other objects in view, the invention will be more fully described hereinafter, and will be more particularly pointed out in the claim appended hereto.

In the drawings wherein like symbols refer to like or corresponding parts throughout the several views, Figure 1 is a detailed front elevation, partly broken away, of a pair of headlights constructed according to an embodiment of this invention, mounted on the front end of a vehicle.

Figure 2 is a detailed top plan, partly broken away and in section, of the headlights.

Figure 3 is a fragmentary sectional view, taken on the line 3—3 of Figure 2.

Figure 4 is a sectional view, taken on the line 4—4 of Figure 3.

Referring to the drawings, the numeral 10 designates generally a casing or shield which is adapted to be secured to a vehicle V at the front thereof, and in the present instance, the casing 10 is secured to one of the fenders F by means of a supporting bracket 13. The casing 10 is constructed as a fragmentary elipse in longitudinal section having substantially a fragmentary egg shape, and the forward end of the casing 10 is formed with a lens receiving rib or rim 11. A lens, generally designated as 12, is mounted in the rim or rib 11, and is substantially elliptical in front elevation, and in vertical section is formed at the upper portion thereof as indicated at 14 on a relatively short radius, whereas the lower portion of the lens 12 as indicated at 15 is formed on a relatively long radius.

The upper lens portion 14 is provided with inner light deflecting ribs 16 and the lower lens portion 15 is formed with outer light ray deflecting ribs 17.

As shown in Figure 2, the rim or lens supporting member 11 is disposed at an angle to the transverse median of the vehicle V, the angle being directed outwardly from the vehicle so that a larger portion of the lens 12 will be positioned at the outer side of the vehicle in order that the light rays will light up the side of the road. In plan, the lens 12 as shown in Figure 4 is formed on a curve having as a center the transverse center of the housing 10.

A reflector, generally designated as 18, is mounted within the housing 10 and extends rearwardly from the lens 12. The reflector 18 is provided with a light ray reflecting upper portion 19, and the inner surface 20 of the lower portion of the reflector 18 is preferably non-reflecting. The upper portion 19 of the reflector 18 is formed with a substantially straight forward portion 21 extending from the lens 12 and the straight portion 21 merges into a sharply curved rear portion 22. The sharply curved rear portion 22 continues downwardly and then forwardly on a relatively long arc. A light bulb socket 23 is carried by the reflector 18, the socket 23 being disposed with the lower portion thereof substantially coplanar with the lower edge 24 of the reflector portion 19. A light bulb 25 is mounted in the socket 23 and is adapted to be connected to a suitable source of current supply by means of a conductor 26.

A colored shield 27, which has a configuration substantially coincidental with the configuration of the upper portion 14 of the lens 12, is disposed within the housing 10 adjacent the ribs 16. The shield 27 is secured within a frame 28 which comprises a lower arcuate frame member 29 and a rear upwardly and rearwardly extending frame member 30. The two frame members 29 and 30 are formed integral with each other and a boss 31 is provided at the junction of the two frame members 29 and 30 for receiving a trunnion or pivot member 32 which may extend through the housing 10 and the reflector 18. There are two of these pivot members 32, as shown in Figure 4.

The shield 27 is gravitatingly held in the desired position with the lower edge of the frame member 29 substantially coplanar with the line 24 by means of a pair of weights 33. The weights 33 may be formed integral with the frame 28 and extend downwardly and rearwardly therefrom, as shown in Figure 3. A pair of upper stop pins 34 are carried by the reflector 18 and disposed in a position to engage the rear frame member 30 so that in normal position, the frame structure 28 will be substantially horizontal and the rear frame member 30 will contact stop members 34. A second pair of lower stop members 35 are carried by the reflector 18 below the trunnions 32 and are positioned to engage the upper portions of the weights 33 where these weights join with the bosses 31. The stop pins 35 are provided so that if the vehicle is moving on an upward inclination the weights 33 will swing the frame structure 28 downwardly at the forward end, and the downward swinging of the frame will be limited by the positions of the stop pins 35. In addition to limiting the downward swinging of the frame structure 28, the stop pins 35 provide a means to prevent undue rocking of the shield 27, and the frame structure 28, if the vehicle is moving over a rough road.

In practice the shields 27 on the driver's side may be colored dark amber and the other shield may be colored dark green for identification which not only provides proper safety but also the most desired anti-glare effect, and an approaching vehicle will be able to determine, in the event one headlight is inoperative, which one of the headlights is not burning, and can thereby be governed accordingly in passing the vehicle.

In the use of these headlights, when the light bulbs 25 are energized, the light rays will be projected forwardly and downwardly by the reflecting portion 19 of the reflector 18. In view of the fact that the headlights are directed forwardly and outwardly from the longitudinal axis of the vehicle, the major portion of the light rays will be directed toward the front of the road, and in this manner, will provide one means whereby the light rays will not provide glaring rays which would strike an approaching vehicle. The ribs 17 carried by the lens 12 are light ray diffusing ribs so as to diffuse the light rays which are directed forwardly and downwardly by the reflecting portion 19 of the reflector 18. The non-reflecting inner surface 20 of the reflector 18 may be of such construction as to provide for the projection of non-glaring light rays which light rays will be directed upwardly through the shield 27 and the upper lens portion 14.

In the event the vehicle is moving on an upward inclination the weights 33 will swing the shield 27 downwardly at the forward portion thereof so as to cut off any forwardly projected light rays and prevent projection of any glaring rays.

It is of course understood that various changes and modifications may be made in the details of construction of this invention, such changes and modifications being limited only by the scope of the appended claim.

What is claimed is:

A headlight comprising a casing, a lens carried by said casing, a reflector in said casing, a light source in said reflector, a dome-shaped light transmitting shield between said lens and said reflector, means swingably supporting said shield, a downwardly and rearwardly inclined weight dependingly carried by said supporting means for gravitatingly maintaining said shield in a position to intercept glaring light rays from said light source and said reflector, an upper pair of stop members carried by said reflector engageable with said supporting means for limiting the swinging of said supporting means in one direction, and a lower pair of stop members carried by said shield engageable with said weight for limiting the swinging of said supporting means in the opposite direction.

JOHN WILLIAM KOLB.